US012585677B2

(12) United States Patent
Rosenthal et al.

(10) Patent No.: US 12,585,677 B2
(45) Date of Patent: Mar. 24, 2026

(54) AUTOMATED GENERATION OF IMPROVED LIST-TYPE ANSWERS IN QUESTION ANSWERING SYSTEMS

(71) Applicant: International Business Machines Corporation, Armonk, NY (US)

(72) Inventors: Sara Rosenthal, Spring Valley, NY (US); Odellia Boni, Giva'at Ela (IL); Michal Shmueli-Scheuer, Tel-aviv (IL); Ora Peled Nakash, Ramat David (IL)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 18/124,589

(22) Filed: Mar. 22, 2023

(65) Prior Publication Data

US 2024/0320246 A1 Sep. 26, 2024

(51) Int. Cl.
*G06F 16/3329* (2025.01)
*G06F 16/332* (2025.01)

(52) U.S. Cl.
CPC ...... *G06F 16/3329* (2019.01); *G06F 16/3322* (2019.01)

(58) Field of Classification Search
CPC ............. G06F 16/3329; G06F 16/3322; G06F 16/332; G06F 16/334; G06F 16/3344; G06F 16/00; G06F 16/243; G06F 16/24522; G06F 16/90332; G06F 16/953; G06F 16/24578; G06F 16/355; G06F 17/30864; G06F 40/166; G06F 40/30; G06F 40/35; G06F 40/242; G06F 40/279; G06F 40/20;

(Continued)

(56) References Cited

U.S. PATENT DOCUMENTS 7,966,316 B2 6/2011 Cao
9,400,956 B2 7/2016 Eggebraaten
(Continued)

FOREIGN PATENT DOCUMENTS

CN 114860917 B 10/2022

OTHER PUBLICATIONS

Acharya, Lok Prasad, "A Systematic Approach for Automatically Answering General-Purpose Objective and Subjective Questions"; Thesis (Ph.D.)—Florida Institute of Technology, Dec. 2019.

(Continued)

*Primary Examiner* — Leshui Zhang

(74) *Attorney, Agent, or Firm* — Caleb D. Wilkes

(57) ABSTRACT

A computer-implemented method comprising: receiving data comprising: a question provided by a user, a list that constitutes a direct answer to the question, and an introductory text to the list; using a first machine learning model to classify the introductory text as redundant or nonredundant, based on the data; using a second machine learning model to classify the list as belonging to a certain list type out of multiple list types, based on the list; and providing to the user: (a) the introductory text, only if the introductory text has been classified as nonredundant, (b) all or only a subset of the items of the list, (c) an indication as to the number of non-provided items of the list or the number of all items of the list, if only a subset of the items is being provided in (b), and (d) a description of the certain list type.

16 Claims, 2 Drawing Sheets

(58) Field of Classification Search
CPC ........ G06F 18/241; G06N 20/00; G06N 5/04; G09B 7/00
USPC ........................................................ 704/1–9
See application file for complete search history.

(56) References Cited

U.S. PATENT DOCUMENTS

| | | | |
|---|---|---|---|
| 9,720,981 | B1 | 8/2017 | Boguraev |
| 2014/0337329 | A1* | 11/2014 | Brown .................... F16H 37/02 707/723 |
| 2021/0326675 | A1* | 10/2021 | Oh ......................... G06N 3/045 |

OTHER PUBLICATIONS

Amit Mishra et al, "A survey on question answering systems with classification"; Journal of King Saud University—Computer and Information Sciences, vol. 28, Issue 3, pp. 345-361, Jul. 2016.

Amos Tversky et al, "Anomalies: Preference Reversals"; Journal of Economic Perspectives vol. 4, No. 2, pp. 201-211, Jun. 1990.

Andrej Miklosik et al, "Google answer box keyword-related analysis a case study"; European Journal of Science and Theology 12, 5, pp. 185-194, Oct. 2016.

Andrej Miklosik et al, "Search engine optimisation and google answer box"; Communication Today 7, 1, Jan. 2016.

Anoop R. Katti et al, "Question Answering using Web Lists"; In Proceedings of the 30th ACM International Conference on Information & Knowledge Management, pp. 3132-3136, Nov. 1-5, 2021.

Ashwin Machanavajjhala et al, "Collective extraction from heterogeneous web lists"; In Proceedings of the fourth ACM international conference on Web search and data mining, pp. 445-454, Feb. 2011.

Boris Katz et al, "Integrating Web-based and Corpus-based Techniques for Question Answering"; Online at: https://www.researchgate.net/publication/221037849, Jan. 2003.

Chen Qu et al, "Answer Interaction in Non-factoid Question Answering Systems"; Online at: https://arxiv.org/pdf/1901.03491.pdf, Jan. 15, 2019.

Daniel Khashabi et al, "GooAQ: Open Question Answering with Diverse Answer Types"; In Findings of the Association for Computational Linguistics: EMNLP 2021, pp. 421-433, Nov. 2021.

Lanotte, P.F. et al, "Automatic Extraction of Logical Web Lists"; In: Andreasen, T., Christiansen, H., Cubero, JC., Raś, Z.W. (eds) Foundations of Intelligent Systems. ISMIS 2014. Lecture Notes in Computer Science, vol. 8502, 2014.

Laurence Dupont, "Exploring Approaches for a Question Answering System"; Online at: https://www.nuecho.com/wp-content/uploads/2022/06/White-Paper-EN-Exploring-Approaches-for-a-Question-Answering-System.pdf, Jun. 7, 2022.

Luc, Ch et al, "A Linguistic Approach to Some Parameters of Layout: A Study of Enumerations"; AAAI Technical Report FS-99-04, Jan. 1999.

Masini, Francesca et al, "List constructions: Towards a unified account"; Italian Journal of Linguistics. 30.1, pp. 49-94, May 2018.

Patrick Huber et al, "CCQA: A New Web-Scale Question Answering Dataset for Model Pre-Training"; In Findings of the Association for Computational Linguistics, pp. 2402-2420, Jul. 2022.

Rivindu Perera et al, "Answer Presentation in Question Answering over Linked Data using Typed Dependency Subtree Patterns"; Proceedings of the Open Knowledge Base and Question Answering (OKBQA) Workshop, pp. 44-48, Dec. 11, 2016.

Rivindu Perera et al, "Answer Presentation with Contextual Information: A Case Study Using Syntactic and Semantic Models"; Advances in Artificial Intelligence. AI 2015, Lecture Notes in Computer Science, vol. 9457, pp. 476-483, Nov. 22, 2015.

Rivindu Perera et al, "Selecting Contextual Peripheral Information for Answer Presentation: The Need for Pragmatic Models"; In PACLIC, 2015.

Roy Bar-Haim et al, "From Arguments to Key Points: Towards Automatic Argument Summarization"; In Proceedings of the 58th Annual Meeting of the Association for Computational Linguistics, ACL 2020, Association for Computational Linguistics, 4029-4039, Jul. 5-10, 2020.

Simons, L.V., "Enriching a Question-Answering System With User Experience Concepts"; Online at: https://studenttheses.uu.nl/handle/20.500.12932/32676, May 2019.

Tom Kwiatkowski et al, "Natural Questions: A Benchmark for Question Answering Research"; Transactions of the Association of Computational Linguistics, vol. 7, pp. 452-466, 2019.

Victor Sanh et al, "DistilBERT, a distilled version of BERT: smaller, faster, cheaper and lighter"; Online at: https://arxiv.org/pdf/1910.01108.pdf, Mar. 1, 2020.

James Kimbley, "How to download multiple files from Google Drive", https://www.kimbley.com/blog/10/6/2016/how-to-download-multiple-files-from-google-drive, Jun. 10, 2016, 2 pages.

No Author, "Characteristics of Particles of Matter", https://web.archive.org/web/20210918021754/https://www.toppr.com/guides/chemistry/matter-in-our-surroundings/characteristics-of-particles-of-matter/, Sep. 18, 2021, 8 pages.

No Author, "Top 10 Highest Mountains in the World", https://web.archive.org/web/20220614042807/https://www.satoriadventuresnepal.com/blog/top-10-highest-mountains-in-the-world/, Jun. 14, 2022, 5 pages.

Shani Jay, "100 Reasons Why I Love You: The Ultimate List", https://datemix.zoosk.com/love/reasons-why-i-love-you/, May 30, 2022, 14 pages.

* cited by examiner

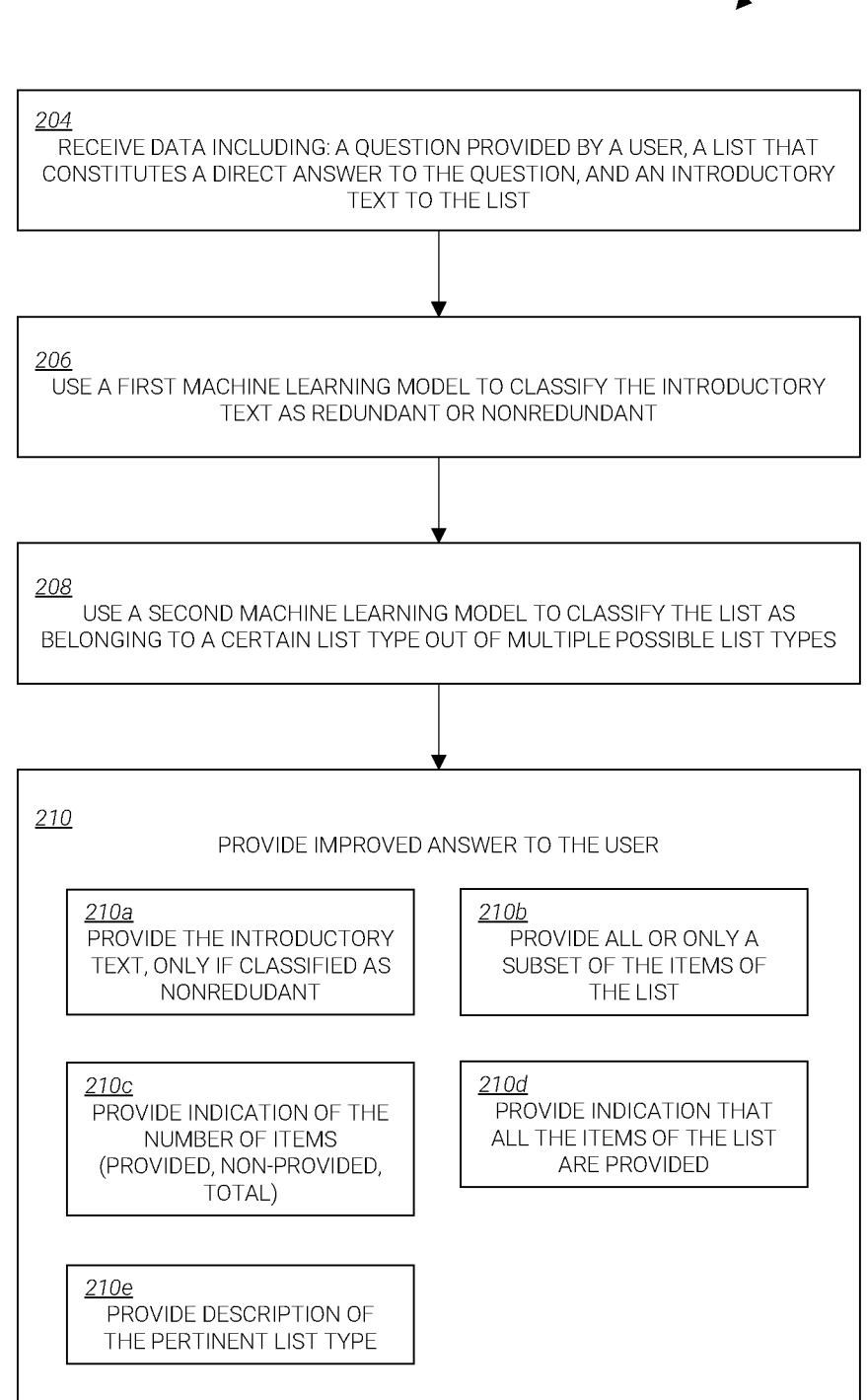

_202_

_204_
RECEIVE DATA INCLUDING: A QUESTION PROVIDED BY A USER, A LIST THAT CONSTITUTES A DIRECT ANSWER TO THE QUESTION, AND AN INTRODUCTORY TEXT TO THE LIST

_206_
USE A FIRST MACHINE LEARNING MODEL TO CLASSIFY THE INTRODUCTORY TEXT AS REDUNDANT OR NONREDUNDANT

_208_
USE A SECOND MACHINE LEARNING MODEL TO CLASSIFY THE LIST AS BELONGING TO A CERTAIN LIST TYPE OUT OF MULTIPLE POSSIBLE LIST TYPES

_210_
PROVIDE IMPROVED ANSWER TO THE USER

_210a_
PROVIDE THE INTRODUCTORY TEXT, ONLY IF CLASSIFIED AS NONREDUDANT

_210b_
PROVIDE ALL OR ONLY A SUBSET OF THE ITEMS OF THE LIST

_210c_
PROVIDE INDICATION OF THE NUMBER OF ITEMS (PROVIDED, NON-PROVIDED, TOTAL)

_210d_
PROVIDE INDICATION THAT ALL THE ITEMS OF THE LIST ARE PROVIDED

_210e_
PROVIDE DESCRIPTION OF THE PERTINENT LIST TYPE

FIGURE 2

AUTOMATED GENERATION OF IMPROVED LIST-TYPE ANSWERS IN QUESTION ANSWERING SYSTEMS

BACKGROUND

The invention relates to the field of Question Answering (QA) systems, particularly those based on machine learning models.

QA is a discipline within the field of computer science that aims to develop software systems capable of understanding and responding to natural language questions posed by users. The objective of QA systems is to retrieve the most relevant answer(s) to a given question from a large corpus of knowledge.

Over the past few decades, there have been significant advancements in natural language processing (NLP) and machine learning in general, which have greatly improved the performance of QA systems. These systems are now able to process large amounts of text data and extract relevant information to provide accurate and timely answers to users' questions.

QA systems based on machine learning models (typically, language models) are a popular approach. These models use various machine learning techniques to learn patterns and relationships in text data, allowing them to understand and interpret natural language more accurately. Machine learning-based QA systems are also able to improve their performance over time as they are exposed to more data and can adapt to changes in the underlying language model.

Some QA systems are capable of providing an answer that includes a list of items, such as a list of restaurants in a particular location, a list of top-rated books in a specific genre, or a list of steps to fix a particular computer error. These types of QA systems are able to understand that the information in the answer should be formatted as a list, and display the list as the answer to the question in a relevant way.

Many of today's prominent Web search engines incorporate such QA capabilities. In addition to providing traditional search results (hyperlinks to Web pages that are deemed relevant to a user's query), these search engines sometimes also provide a direct answer to the user's query when the query is phrased as a question or is otherwise deemed suitable for such direct answering. Depending on the question, the search engine may provide a direct answer in the form of a paragraph, a list, a table, or the like. For example, when the query is "What are the five tallest mountain peaks in the world?," a search engine may provide a direct answer in the form of a list of mountains ranked by their elevation, followed by traditional search results of hyperlinks to Web pages relevant to query.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising, automatically: receiving data comprising: a question provided by a user, a list that constitutes a direct answer to the question, and an introductory text to the list; using a first machine learning model to classify the introductory text as redundant or nonredundant, based on the data; using a second machine learning model to classify the list as belonging to a certain list type out of multiple list types, based on the list; and providing to the user: (a) the introductory text, only if the introductory text has been classified as nonredundant, (b) all or only a subset of the items of the list, (c) an indication as to the number of non-provided items of the list or the number of all items of the list, if only a subset of the items is being provided in (b), and (d) a description of the certain list type.

Another embodiment relates to a system comprising: (i) at least one hardware processor; and (ii) a non-transitory computer-readable storage medium having program code embodied therewith, the program code executable by said at least one hardware processor to, automatically: receive data comprising: a question provided by a user, a list that constitutes a direct answer to the question, and an introductory text to the list; use a first machine learning model to classify the introductory text as redundant or nonredundant, based on the data; use a second machine learning model to classify the list as belonging to a certain list type out of multiple list types, based on the list; and provide to the user: (a) the introductory text, only if the introductory text has been classified as nonredundant, (b) all or only a subset of the items of the list, (c) an indication as to the number of non-provided items of the list or the number of all items of the list, if only a subset of the items is being provided in (b), and (d) a description of the certain list type.

A further embodiment relates to a computer program product comprising a non-transitory computer-readable storage medium having program code embodied therewith, the program code executable by at least one hardware processor to, automatically: receive data comprising: a question provided by a user, a list that constitutes a direct answer to the question, and an introductory text to the list; use a first machine learning model to classify the introductory text as redundant or nonredundant, based on the data; use a second machine learning model to classify the list as belonging to a certain list type out of multiple list types, based on the list; and provide to the user: (a) the introductory text, only if the introductory text has been classified as nonredundant, (b) all or only a subset of the items of the list, (c) an indication as to the number of non-provided items of the list or the number of all items of the list, if only a subset of the items is being provided in (b), and (d) a description of the certain list type.

In some embodiments, redundant introductory text is introductory text that conveys information which is included, explicitly or implicitly, in at least one of: the question and the list; and nonredundant introductory text is introductory text that conveys information which is not included, explicitly or implicitly, in at least one of: the question and the list.

In some embodiments, the method further comprises, or the program code is further executable to, train the first machine learning model by: obtaining multiple samples, each comprising a question, a list, and an introductory text; for each of the samples: computing a similarity measure between (i) at least one of: the respective question and the respective list, and (ii) the respective introductory text, and weakly labeling the respective introductory text as redundant or nonredundant, based on the similarity measure associated with the respective introductory text and on a predetermined similarity measure threshold; and adapting a language model based on the samples and the weak labels of the introductory texts.

In some embodiments, the method further comprises, or the program code is further executable to, train the second machine learning model by: defining each of multiple question patterns as corresponding to one of the multiple list types; obtaining multiple samples, each comprising a question, an introductory text, and a list; for each of the samples: matching the respective question with one of the question patterns, and weakly labeling the respective list and the respective introductory text as belonging to the list type which corresponds to the matched question pattern; and adapting a language model based on the samples and the weak labels of the lists and of the introductory texts.

In some embodiments, the method further comprises, or the program code is further executable to, train the second machine learning model by: defining each of multiple introductory text patterns as corresponding to one of the multiple list types; obtaining multiple samples, each comprising an introductory text and a list; for each of the samples: matching the respective introductory text with one of the introductory text patterns, and weakly labeling the respective list as belonging to the list type which corresponds to the matched introductory text pattern; and adapting a language model based on the samples and the weak labels of the lists.

In some embodiments, the multiple list types comprise at least some of: a sequence, which is a list of interdependent items with a meaningful order; a ranking, which is a list of independent items with a meaningful order; a catalog, which is a list of independent items without a meaningful order, wherein each of the items is an optional answer to the question; and an itemization, which is a list of independent items without a meaningful order, wherein all the items are necessary to answer the question.

In some embodiments, when only a subset of the items is being provided in (b), the method further comprises providing to the user a hyperlink to a document which contains all the items; and when all the items are being provided in (b), the method further comprises providing to the user an indication that all the items are being provided.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 2 is a flowchart of a method for automatically compiling an improved answer to a question and providing it to the user, according to an embodiment.

DETAILED DESCRIPTION

Figure 1:
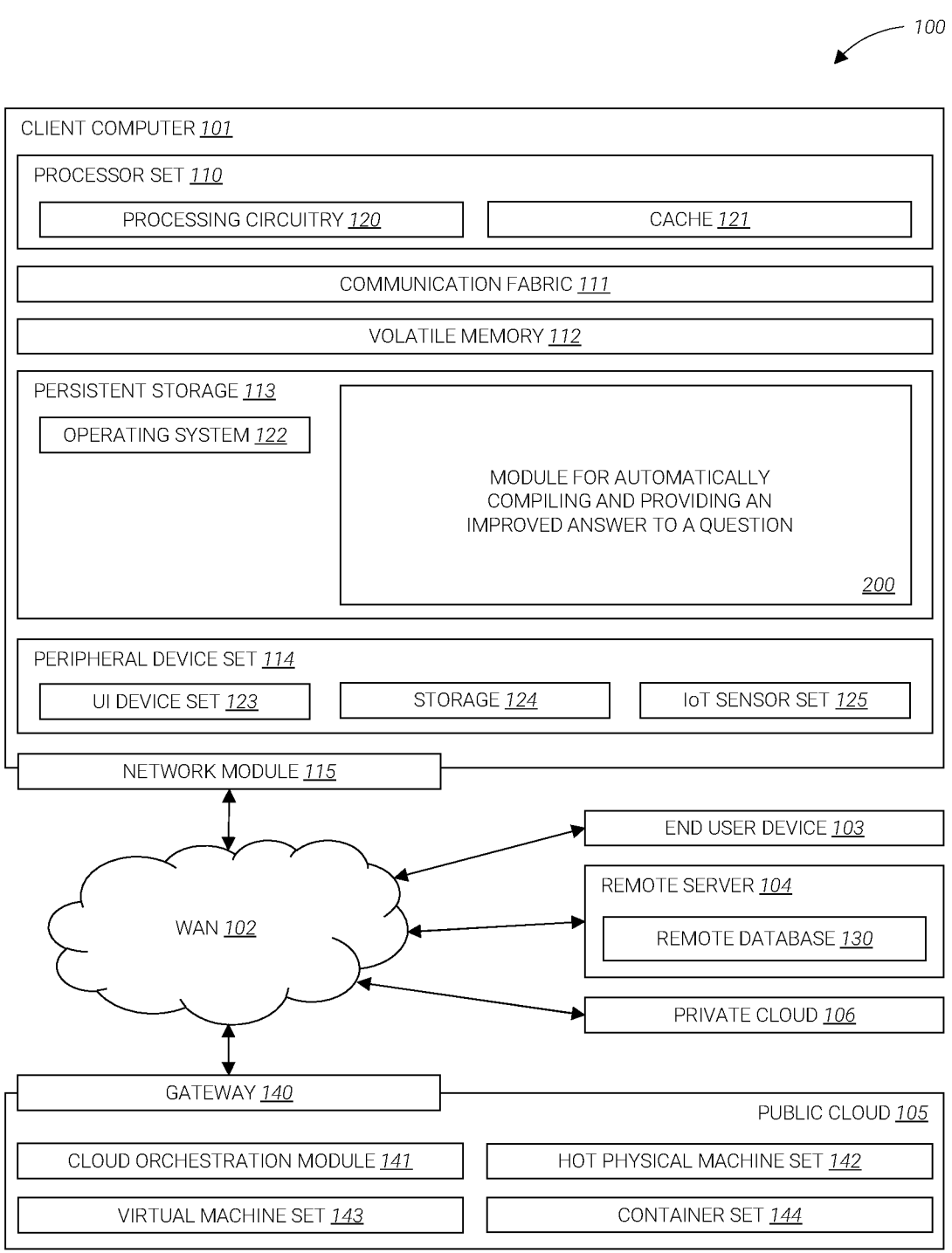
FIG. 1 is a block diagram of an exemplary computing environment, containing an example of an environment for the execution of at least some of the computer code involved in performing the inventive methods, according to an embodiment.

Disclosed herein are a computer-implemented method, a system, and a computer program product that, given (a) a question provided by a user, (b) a list that constitutes a direct answer to the question, and (c) an introductory text to the list, employ machine learning models to automatically compile an improved answer to the question and provide it to the user.

The list and introductory text may be provided by a conventional machine learning-based QA system, as known in the art.

The Compilation of the Improved Answer May Include, for Example:

1. Utilization of a machine learning model to determine whether the introductory text conveys information which is included, explicitly or implicitly, in the question and/or in the list. The introductory text may be provided to the user only if it does not convey such information, such that the user is not burdened to read an introductory text which he or she are probably already aware of (given how they phrased their question).

2. Utilization of a machine learning model to determine the type of the list (for example, a sequence, a ranking, a catalog, an itemization, etc.), so that a suitable description of the list type may be provided to the user and enhance his or her understanding of the list. The determined list type may further be utilized to affect a decision of whether to provide the user with the entire list or only a subset of it, and, if just a subset is provided, to optionally (a) provide a hyperlink to a document containing the entire list, and (b) provide an indication as to how many items were omitted. Further options regarding information that is provided to the user in the framework of the improved answer are discussed below.

Reference is now made to FIG. 1, which shows a block diagram of an exemplary computing environment 100, containing an example of an environment for the execution of at least some of the computer code involved in performing the inventive methods, such as a module 200 for automatically compiling an improved answer to a question and providing it to the user. In addition to module 200, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and module 200, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in module 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The instructions of module 200 are now discussed with reference to the flowchart of FIG. 2, which illustrates a method 202 for automatically compiling an improved answer to a question and providing it to the user, in accordance with an embodiment.

Steps of method 202 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, or by any other applicable component of computing environment 100), unless specifically stated otherwise.

In a step 204, data may be received, including: a question provided by a user, a list that constitutes a direct answer to the question, and an introductory text to the list. The list and the introductory text may be generated or otherwise obtained by a conventional machine learning-based QA system. Module 200 (of FIG. 1) may be part of such QA system, or the module may communicate with a separate QA system, for example using an API (Application Programming Interface) of that separate QA system.

The question may be provided in natural language, and may be phrased either explicitly as a question (for example, "What are the five tallest mountain peaks in the world?") or only implicitly as a question (for example, "Types of user interfaces"). Both options may call for an answer in the form of a list-either a list of mountains in response to the first exemplary question, or a list of user interface types in response to the second exemplary question.

The list, as mentioned, constitutes a direct answer to the question—an answer which may entirely satisfy the user's need for information. This stands in contrast to traditional search results, that typically only include a set of hyperlinks to Web pages that are deemed relevant to a user's query, along with an excerpt from each Web page; the user then has to follow one or more of these hyperlinks in order to read the information provided on the pertinent Web pages and potentially find an answer (or a number of alternative answers) to the question.

For example, the list which may be obtained by the QA system in response to the question "What are the five tallest mountain peaks in the world?" may be:

1. Mt. Everest (29,029 ft/8,848 m), Nepal
2. Mt. K2 (28,251 ft/8,611 m), Pakistan
3. Mt. Kangchenjunga (28,169 ft/8,586 m), India
4. Mt. Lhotse (27,940 ft/8,516 m), Nepal 5. Mt. Makalu (27,825 ft/8,481 m), Nepal The introductory text may include one or a few sentences generally describing the contents of the list. In many conventional QA systems, the introductory text is presented immediately before the list. The introductory text may or may not convey information beyond what is already included (explicitly or implicitly) in the question itself. For example, some introductory texts retrieved or generated by QA systems merely paraphrase the question; for instance, for the question "What are the five tallest mountain peaks in the world?," the introductory text may be "Top 5 highest mountains in the world." Such introductory text may be considered redundant, because the list provides the user with exactly the answer he or she were seeking. In contrast, some introductory texts may convey information that is not included in the question itself, and is necessary for the user to correctly understand the list; for instance, in response to the question "Eligibility for a green card," the introductory text may be "Eligibility Criteria for a Green Card through Family," meaning that the appended list only includes the criteria for obtaining a Green Card through family ties, and not, for example, through employment or asylum. Such introductory text is certainly nonredundant, because its associated list does not precisely or fully addresses the user's question; without that introductory text, the user may falsely believe that the list is an exhaustive list of all the criteria for obtaining a Green Card, when in fact the list only constitutes a very partial answer to the question.

Another scenario in which an introductory text may be deemed redundant is when the list itself coveys the same (or approximately the same) information as the introductory text. For example, assume that the question is "How to replace a car tire," the introductory text is "Steps to replace a car tire," and the items of the list are of the style: "Step 1: Loosen the bolts . . . ", "Step 2: Use a jack stand to . . . ", etc. Clearly, the words "Step X" in every list item make the introductory text redundant.

In a step 206, a machine learning model (or "model" for short) may be used to classify the introductory text as redundant or nonredundant, based on the data received in step 204. Namely, the question, list, and introductory text may be provided as inputs to the model, such that the model outputs a class name (be it "redundant"/"nonredundant" or any other names or even unique numbers conveying the same intent) which most probably suits the introductory text.

The model is optionally a language model, but could be any suitable machine learning model capable of classifying texts of the kind of a typical introductory text into two classes.

The model may undergo training prior to execution of method 202, for example using the following steps:

First, training data may be obtained, such as from prior executions of a QA system. The training data may include multiple samples, each including: a question provided by a user, a list generated by the QA system in response to the question, and an introductory text generated by the QA system in response to the question. In experiments performed by the inventors, such training data was obtained from the following three publicly-available datasets: NQ (Tom Kwiatkowski et al., "Natural Questions: A Benchmark for Question Answering Research," in Transactions of the Association of Computational Linguistics, 2019), GooAQ (Daniel Khashabi et al., "GooAQ: Open Question Answering with Diverse Answer Types," in Findings of the Association for Computational Linguistics: EMNLP 2021, pp 421-433), and CCQA (Patrick Huber et al., "CCQA: A New Web-Scale Question Answering Dataset for Model Pre- Training," in Findings of the Association for Computational Linguistics: NAACL 2022, pp 2402-2420).

Then, for each of these samples, a similarity measure may be computed between the respective question (optionally, together with the list) and the respective introductory text, to quantify the degree of similarity between the two. For example, the similarity measure may be in the form of an overlap score S, computed according to the following formula:

$$S(q, i) = \frac{|\bigcap (tok(q), tok(i))|}{|tok(i)|}$$

where q is the question, i is the introductory text, and tok(q) and tok(i) are the tokens (typically, whole words or parts of words) found in the texts q and i, respectively. Optionally, q may include both the question and the list, because the introductory text could also convey information already included in the list itself, as explained above.

Those of skill in the art will recognize that, in lieu of the above exemplary formula, a similarity measure may be computed using various other conventional techniques for quantifying the similarity and/or overlap of two texts.

Next, for each of the samples, the respective introductory text may be weakly labeled as redundant or nonredundant based on its associated similarity measure and a predetermined threshold that sets the boundary between similarity measures leading to these alternative labels. In experiments conducted by the inventors on training data from the three aforementioned datasets, a threshold of 0.45 (assuming an overlap score in the interval [0,1]) was found to quite accurately label as 'redundant' introductory texts exceeding this score, and vice versa. However, a different threshold may be selected based on factors favored by the user performing the training, such as based on the exact formula used to compute the similarity measure, etc.

Then, a language model may be adapted (for example, fine-tuned) based on the samples and the weak labels of the introductory texts. Namely, the samples and the weak labels may be provided as inputs to the language model, which may undergo a fine-tuning process that trains it to classify any introductory texts as either redundant or nonredundant. In experiments conducted by the inventors, the DistilBERT language model (Victor Sanh et al., "DistilBERT, a distilled version of BERT: smaller, faster, cheaper and lighter," arXiv:1910.01108 [cs.CL], 2019) was fine-tuned on samples from the three aforementioned data sets, with weak labels that were based on the aforementioned 0.45 overlap score threshold. Then, the fine-tuned DistilBERT language model was tested on test set of 220 samples whose introductory texts were manually labeled, demonstrating advantageous performance of 0.822/0.476/0.603 for recall/precision/f1, and an accuracy of 0.644.

As an alternative to fine-tuning the language model, the language model may be adapted by way of prompt-tuning. In prompt-tuning, prompts expressing the samples and the weak labels of the introductory texts may be fed to the language model, to give it task-specific context and enable it to then classify introductory texts as redundant or nonredundant.

In a step 208, another machine learning model (again, "model" for short) may be used to classify the list as belonging to a certain list type out of multiple possible list types, based on the list itself. Namely, the list may be provided as an input to the model, such that the model outputs a class name corresponding to the certain list type (be it the actual name given to the list type or any other name or even unique number conveying the same intent) which most probably suits the list.

The model is optionally a language model, but could be any suitable machine learning model capable of classifying texts of the kind of a typical introductory text into multiple classes.

The four following exemplary list types may be considered (and those of skill in the art may recognize further types):

A. Sequence: A list of interdependent items with a meaningful order. For instance, a list of steps to accomplish a certain task may be regarded as a sequence, because every step from the second step on is dependent upon completion of the previous step, and the order of steps is therefore meaningful and must be adhered to in order to successfully accomplish the task.

For example, in response to the question "How to sign up to IBM Watson?," a QA system may provide the following sequence-type list:

1. Go to the IBM Cloud login page, and click Create an IBM Cloud account.
2. Enter your IBMid email address.
3. Complete the remaining fields with your information.
4. Click Create account.
5. Confirm your account by clicking the link in the confirmation email that's sent to your provided email address.

The items in this exemplary list are clearly interdependent, and their order is meaningful.

B. Ranking: A list of independent items with a meaningful order. A ranking-type list is typically used to convey, by the order of items, their ranking with respect to some quantifiable criteria. However, the items of such list may be regarded as independent of one another, because this type of list is not intended to convey or suggest any relationships between the items.

An example for a ranking-type list is the example already presented above, of the five tallest mountain peaks in the world:

1. Mt. Everest (29,029 ft/8,848 m), Nepal
2. Mt. K2 (28,251 ft/8,611 m), Pakistan
3. Mt. Kangchenjunga (28,169 ft/8,586 m), India
4. Mt. Lhotse (27,940 ft/8,516 m), Nepal
5. Mt. Makalu (27,825 ft/8,481 m), Nepal The list is arranged in a descending order according to the elevation of each mountain peak. The listed mountains are independent, in the sense that the list does not attempt to convey or suggest any relationships between them.

C. Catalog: A list of independent items without a meaningful order, in which each of the items is just an optional answer to the question. A catalog-type list may be used to convey multiple possible answers to the user's question; accordingly, the order of such list may be arbitrary, and each item may be considered as merely optional.

For example, in response to the question "4 reasons of why I love you," a QA system may provide the following catalog-type list:

I love the way you look at me.
You make me feel like I'm the only person in the world.
With you I can be myself.
I love you because we are family and friends at the same time.

The items in this exemplary list are independent, in the sense that the list does not attempt to convey or suggest any relationships between them. The order of items is arbitrary and not meaningful, and each item is considered just an optional answer to the user's question.

D. Itemization: A list of independent items without a meaningful order, but in which all items are necessary to answer the user's question. An itemization-type list may be used to provide a complete, exhaustive answer to a question, in a situation where such answer clearly exists.

For example, in response to the question "What are the seven wonders of the world?," a QA system may provide the following itemization-type list:

The Colosseum, Rome, Italy.
The Great Wall of China.
The Taj Mahal, India.
Christ the Redeemer, Brazil.
Machu Picchu, Peru.
Chichén Itzá, Mexico.
Petra, Jordan.

All seven items on this exemplary list are necessary to answer the question, because there is indeed a widely-acceptable list of the seven wonders of the world, and the entire list is necessary to correctly inform the user. The items in this exemplary list are independent, in the sense that the list does not attempt to convey or suggest any relationships between them. The order of items is arbitrary and not meaningful, since the question did not intend to obtain a ranking of the seven wonders of the world, and no such widely-acceptable ranking may even exist.

With respect to the four exemplary list types discussed above, it should be noted that each list type may be provided by the QA system with or without item numbering, and that an unnumbered list may or may not utilize a prefix symbol (such as a dash, bullet, etc.) for each item. While it is customary for sequence-type and ranking-type lists to be provided as numbered lists to emphasize the importance of the item order, this is not mandatory; the mere order of presentation of the items may be sufficient to convey their intended order.

The model of step 208 may undergo training prior to execution of method 202, to enable it to classify the input list into one of multiple possible list types. The training may be performed, for example, using the following steps:

First, multiple question patterns and/or introductory text patterns may be defined, each corresponding to one of the multiple list types. A question pattern is a linguistic structure of the question's text, that conveys the user's intent to obtain an answer in the form of a specific list type. An introductory text pattern is a linguistic structure of the introductory text, that implies that the QA system which provided the introductory text also provided a certain associated list type.

The table below illustrates exemplary question patterns corresponding to the four exemplary list types discussed above:

| List type | Question patterns |
|---|---|
| Sequence | "how to X", "steps to X" |
| Ranking | "top X", "X most", "X highest", "X best" |
| Catalog | "X reasons for", "examples of X" |
| Itemization | "what are the X", "list the X" |

The examples given in the table are of course non-exhaustive, and are merely intended to illustrate a few possibilities. In practice, question patterns and introductory text patterns alike may be constructed using regular expressions (RegEx) or any other conventional technique that enables defining an order of keywords (such as the words in the above table) and placeholders (such as the "X" marks in the above table).

Next, training data may be obtained, such as from prior executions of a QA system. Three options may be considered for the training data: First, samples that each include a question and a list (generated/retrieved by the QA system in response to the question), with the rationale of learning to classify a list given the label of its associated question. Second, samples that each include an introductory text and a list (both generated/retrieved by the QA system for provision in response to a certain question), with the rationale of learning to classify a list given the label of its associated introductory text. Third, a combination of the above two options: samples that each include a question, an introductory text, and a list, with the rationale of learning to classify a list given the labels of both its associated question and introductory text.

Next, for each of the samples, its question and/or introductory text, depending on which of the above three options is used, may be matched with one of the question patterns and/or introductory text patterns, respectively. The matching may be based on any known technique for quantifying the fit of a given text to a pattern; the question or introductory text may be deemed as "matching" a particular pattern if it fits that pattern more than all other patterns. Optionally, samples in which no match is found are omitted from the training data and are not used in the following steps.

Then, based on the matching, the list in each of the samples may be weakly labeled as belonging to the list type which corresponds to the matched question pattern and/or matched introductory text pattern, as the case may be. For example, in a certain sample, if the question "What are the top 10 movies of all times?" or the introductory text "The all times top-10 movies" have been matched to a certain pattern that corresponds to a ranking-type list, the list included in that sample may be weakly labeled as "ranking."

Next, a language model may be adapted (for example, fine-tuned) based on the samples (whose contents depend on which of the above three options is used) and the weak labels of the lists. Namely, the samples and the weak labels may be provided as inputs to the language model, which may undergo a fine-tuning process that trains it to classify any list as belonging to a certain list type, such as "sequence," "ranking," "catalog," or "itemization." In experiments conducted by the inventors, the DistilBERT language model was fine-tuned on samples from the three aforementioned data sets as follows: First, lists were weakly labeled with their respective list type based on their matched questions. Second, those lists, together with their associated introductory texts, were used as the input to the DistilBERT language model. It should be noted that the experimentation was based on just three defined list types: "sequence," "ranking," and "unordered," the latter being a combination of the aforementioned "catalog" and "itemization" types. Classification accuracy on the weakly-annotated samples was 0.97. This high accuracy may be at least partially attributed to the fact that classification was only attempted on samples that matched with a pattern (as non-matched samples were discarded). Accuracy was additionally tested on a smaller, manually-labeled set, where it was reduced to 0.772, likely because this set did include some non-matched samples which skewed the performance negatively; still, an accuracy of 0.772 on such 'noisy' set may be considered good.

As an alternative to fine-tuning the language model, the language model may be adapted by way of prompt-tuning. In prompt-tuning, prompts expressing the samples and the weak labels of the lists may be fed to the language model, to give it task-specific context and enable it to then classify lists as belonging to different list types.

Following execution of steps 206 and 208, the introductory text provided by the user is classified as redundant or nonredundant, and the list generated by the QA system is classified as being of a certain type. Then, in a step 210, an improved answer to the user's questions may be provided to the user, in lieu of merely providing the user with whatever answer (list, optionally with an introductory text) the QA system generated. The provision to the user may include transmission of the improved answer to a computing device used by the user (typically, the same computing device the user used to transmit the question), such that the computing device presents the answer on a display thereof.

It should be noted that, in an alternative embodiment, method 202 may lack either step 206 or step 208, meaning that the method classifies only an introductory text or only a list. In such alternative embodiment, only a portion of the actions of step 210 may be executed, respective of what type of classification is available from either step 206 or 208.

Step 210 may include a number of actions, discussed herein as sub-steps:

In a sub-step 210a, the introductory text may be provided to the user, but only if that introductory text has been classified as nonredundant. Advantageously, this makes the provided answer more concise, and avoids providing the user with information which is not necessary for a correct understanding of the list. In case the introductory text is indeed provided in this sub-step, it may be provided in such a way that it is presented immediately before the list (discussed in the next sub-step).

In a sub-step 210b, all or only a subset of the items of the list may be provided to the user. The decision whether to provide all items or just a subset thereof may be taken, automatically, based on one or more of the following criteria: First, the QA system itself (or an information retrieval system with QA capabilities, such as a Web search engine) may pose a limit on the number of items it wishes to provide to the user, typically given constraints relating to user experience. Second, such limit may be posed by module 200 (of FIG. 1) itself, given similar predefined constraints. Third, the decision may be taken corresponding to the list type determined in step 208: For example, it may be preferable that itemization-type lists and sequence-type lists are provided in full, or with relatively more items compared to ranking-type lists and even more so catalog-type lists; the motivation may be to provide a complete answer in cases where the question calls for a complete answer, which is typically the case with questions yielding itemization-type lists and sequence-type lists, and to a lesser extent ranking-type lists and catalog-type lists.

In a sub-step 210c, if only a subset of the items is being provided in sub-step 210b, then an indication as to the number of non-provided items of the list may be provided to the user. For example, if the full list includes 10 items but only 7 items are being provided to the user, the user may further be provided with an indication that the list includes 3 additional items which have not been provided. For instance, the user may be provided with a text of the style of "The list includes 3 additional items which are not being shown." A further possibility is to make such indication by noting the total number of items on the list, and optionally also the size of the subset being provided; for example, "The full list includes 10 items but not all are shown," or "The full list includes 10 items, but only the first 7 items are shown," or simply "7/10 items."

In a sub-step 210d, if all the items of the list are being provided in sub-step 210b, then an indication to that effect may be provided to the user, with or without also denoting the total number of items on the list. For example, "The entire list is shown," or "The list includes 10 items, all are shown."

In a sub-step 210e, a description of the pertinent list type may be provided to the user. Each of the list types classifiable by step 208 may have its own preprepared descriptive text, which is selected for provision to the user corresponding to the classified list type. For example:

A. When the list type is "sequence," the description may be "This list is a sequence. That means the order matters, and the items are dependent. It is therefore important to follow all the steps in the order they are presented."

B. When the list type is "ranking," the description may be "This list is a ranking. That means the order matters, but the items are independent."

C. When the list type is "catalog," the description may be "This list is a catalog. That means the order doesn't matter, the items are independent and optional."

D. When the list type is "itemization," the description may be "This list is an itemization. That means the order doesn't matter, but all the items are important."

Of course, any description which conveys the main characteristics of the list type may be used, and the above are merely illustrative examples.

A user study conducted by the inventors, in which 106 users participated, confirmed that a majority of users find the improved answer, according to step 210, superior to a conventional answer that consists of just a list and an introductory text.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising, automatically:

receiving data comprising: a question provided by a user, a list that constitutes a direct answer to the question, and an introductory text to the list;

using a first machine learning model to classify the introductory text as redundant or nonredundant, based on at least one of the question and the list, wherein the first machine learning model is a language model, wherein:

redundant introductory text is introductory text that conveys information which is included, explicitly or implicitly, in at least one of the question and the list; and nonredundant introductory text is introductory text that conveys information which is not included, explicitly or implicitly, in at least one of the question and the list;

using a second machine learning model to classify the list as belonging to a certain list type out of multiple list types, based on the list, wherein the second machine learning model is another language model;

providing to the user:

(a) the introductory text, only if the introductory text has been classified as nonredundant, (b) all or only a subset of items of the list, (c) an indication as to a number of non-provided items of the list or a number of all items of the list, if only a subset of the items is being provided in (b), and (d) a description of the certain list type; and training the first machine learning model by:

obtaining multiple samples, each comprising a question, a list, and an introductory text;

for each of the samples:

computing a similarity measure between (i) at least one of: the respective question and the respective list, and (ii) the respective introductory text, and weakly labeling the respective introductory text as redundant or nonredundant, based on the similarity measure associated with the respective introductory text and on a predetermined similarity measure threshold; and adapting a first language model based on the samples and the weak labels of the introductory texts to form the first machine learning model.

2. The computer-implemented method of claim 1, further comprising training the second machine learning model by:

defining each of multiple question patterns as corresponding to one of the multiple list types;

obtaining multiple samples, each comprising a question, an introductory text, and a list;

for each of the samples:

matching the respective question with one of the question patterns, and weakly labeling the respective list and the respective introductory text as belonging to the list type which corresponds to the matched question pattern; and adapting a language model based on the samples and the weak labels of the lists and of the introductory texts.

3. The computer-implemented method of claim 1, further comprising training the second machine learning model by:

defining each of multiple introductory text patterns as corresponding to one of the multiple list types;

obtaining multiple samples, each comprising an introductory text and a list;

for each of the samples:

matching the respective introductory text with one of the introductory text patterns, and weakly labeling the respective list as belonging to the list type which corresponds to the matched introductory text pattern; and adapting a language model based on the samples and the weak labels of the lists.

4. The computer-implemented method of claim 1, wherein the multiple list types comprise at least some of:

a sequence, which is a list of interdependent items with a meaningful order;

a ranking, which is a list of independent items with a meaningful order;

a catalog, which is a list of independent items without a meaningful order, wherein each of the items is an optional answer to the question; and an itemization, which is a list of independent items without a meaningful order, wherein all the items are necessary to answer the question.

5. The computer-implemented method of claim 1, wherein:

when only a subset of the items is being provided in (b), the method further comprises providing to the user a hyperlink to a document which contains all the items; and when all the items are being provided in (b), the method further comprises providing to the user an indication that all the items are being provided.

6. A system comprising:

(i) at least one hardware processor; and (ii) a non-transitory computer-readable storage medium having program code embodied therewith, the program code executable by said at least one hardware processor to, automatically:

receive data comprising: a question provided by a user, a list that constitutes a direct answer to the question, and an introductory text to the list, use a first machine learning model to classify the introductory text as redundant or nonredundant, based on at least one of the question and the list, wherein the first machine learning model is a language model, use a second machine learning model to classify the list as belonging to a certain list type out of multiple list types, based on the list, wherein the second machine learning model is another language model, provide to the user:

(a) the introductory text, only if the introductory text has been classified as nonredundant, (b) all or only a subset of items of the list, (c) an indication as to a number of non-provided items of the list or a number of all items of the list, if only a subset of the items is being provided in (b), and (d) a description of the certain list type; and train the second machine learning model by:

defining each of multiple question patterns as corresponding to one of the multiple list types;

obtaining multiple samples, each comprising a question, an introductory text, and a list;

for each of the samples:

matching the respective question with one of the question patterns, and weakly labeling the respective list and the respective introductory text as belonging to the list type which corresponds to the matched question pattern; and adapting a first language model based on the samples and the weak labels of the lists and of the introductory texts to form the second machine learning model.

7. The system of claim 6, wherein:

redundant introductory text is introductory text that conveys information which is included, explicitly or implicitly, in at least one of: the question and the list; and nonredundant introductory text is introductory text that conveys information which is not included, explicitly or implicitly, in at least one of: the question and the list.

8. The system of claim 7, wherein the program code is further executable to train the first machine learning model by:

obtaining multiple samples, each comprising a question, a list, and an introductory text;

for each of the samples:

computing a similarity measure between (i) at least one of: the respective question and the respective list, and (ii) the respective introductory text, and weakly labeling the respective introductory text as redundant or nonredundant, based on the similarity measure associated with the respective introductory text and on a predetermined similarity measure threshold; and adapting a language model based on the samples and the weak labels of the introductory texts.

9. The system of claim 6, wherein the training of the second machine learning model further comprises:

defining each of multiple introductory text patterns as corresponding to one of the multiple list types;

obtaining multiple additional samples, each comprising an introductory text and a list;

for each of the additional samples:

matching the respective introductory text with one of the introductory text patterns, and weakly labeling the respective list as belonging to the list type which corresponds to the matched introductory text pattern; and further adapting the first language model based on the additional samples and the additional weak labels of the lists to help for the second machine learning model.

10. The system of claim 6, wherein the multiple list types comprise at least some of:

a sequence, which is a list of interdependent items with a meaningful order;

a ranking, which is a list of independent items with a meaningful order;

a catalog, which is a list of independent items without a meaningful order, wherein each of the items is an optional answer to the question; and an itemization, which is a list of independent items without a meaningful order, wherein all the items are necessary to answer the question.

11. The system of claim 6, wherein:

when only a subset of the items is being provided in (b), the program code further is executable to automatically provide to the user a hyperlink to a document which contains all the items; and when all the items are being provided in (b), the program code further is executable to automatically provide to the user an indication that all the items are being provided.

12. A computer program product comprising a non-transitory computer-readable storage medium having program code embodied therewith, the program code executable by at least one hardware processor to, automatically:

receive data comprising: a question provided by a user, a list that constitutes a direct answer to the question, and an introductory text to the list;

use a first machine learning model to classify the introductory text as redundant or nonredundant, based on at least one of the question and the list, wherein the first machine learning model is a language model, use a second machine learning model to classify the list as belonging to a certain list type out of multiple list types, based on the list, wherein the second machine learning model is another language model, provide to the user:

(a) the introductory text, only if the introductory text has been classified as nonredundant, (b) all or only a subset of items of the list, (c) an indication as to a number of non-provided items of the list or a number of all items of the list, if only a subset of the items is being provided in (b), and (d) a description of the certain list type; and train the second machine learning model by:

defining each of multiple question patterns as corresponding to one of the multiple list types;

obtaining multiple samples, each comprising a question, an introductory text, and a list;

for each of the samples:

matching the respective question with one of the question patterns, and weakly labeling the respective list and the respective introductory text as belonging to the list type which corresponds to the matched question pattern; and adapting a first language model based on the samples and the weak labels of the lists and of the introductory texts to form the second machine learning model.

13. The computer program product of claim 12, wherein:

redundant introductory text is introductory text that conveys information which is included, explicitly or implicitly, in at least one of: the question and the list; and nonredundant introductory text is introductory text that conveys information which is not included, explicitly or implicitly, in at least one of: the question and the list.

14. The computer program product of claim 13, wherein the program code is further executable to train the first machine learning model by:

obtaining multiple samples, each comprising a question, a list, and an introductory text;

for each of the samples:

computing a similarity measure between (i) at least one of: the respective question and the respective list, and (ii) the respective introductory text, and weakly labeling the respective introductory text as redundant or nonredundant, based on the similarity measure associated with the respective introductory text and on a predetermined similarity measure threshold; and adapting a language model based on the samples and the weak labels of the introductory texts.

15. The computer program product of claim 12, wherein the program code is further executable to further train the second machine learning model by:

defining each of multiple question patterns as corresponding to one of the multiple list types;

obtaining multiple additional samples, each comprising a question, an introductory text, and a list;

for each of the additional samples:

matching the respective question with one of the question patterns, and weakly labeling the respective list and the respective introductory text as belonging to the list type which corresponds to the matched question pattern; and further adapting the first language model based on the additional samples and the additional weak labels of the lists and of the introductory texts to help form the second machine learning model.

16. The computer program product of claim 12, wherein the multiple list types comprise at least some of:

a sequence, which is a list of interdependent items with a meaningful order;

a ranking, which is a list of independent items with a meaningful order;

a catalog, which is a list of independent items without a meaningful order, wherein each of the items is an optional answer to the question; and an itemization, which is a list of independent items without a meaningful order, wherein all the items are necessary to answer the question.

* * * * *